United States Patent
Fox

(10) Patent No.: US 6,712,247 B1
(45) Date of Patent: Mar. 30, 2004

(54) ROOF RACK

(76) Inventor: William H. Fox, 10544 Cadwell Rd., Santee, CA (US) 92071

( * ) Notice: Subject to any disclaimer, the term of this patent is extended or adjusted under 35 U.S.C. 154(b) by 95 days.

(21) Appl. No.: 10/171,901

(22) Filed: Jun. 14, 2002

(51) Int. Cl.[7] .............................................. B60R 9/042
(52) U.S. Cl. ...................... 224/310; 224/324; 224/331; 414/462
(58) Field of Search .................. 224/310, 319, 224/324, 326, 329, 330, 331; 414/462

(56) References Cited

U.S. PATENT DOCUMENTS

| | | | | |
|---|---|---|---|---|
| 2,551,351 A | * | 5/1951 | Swenson | 414/462 |
| 3,495,729 A | * | 2/1970 | Kruse | 414/462 |
| 4,062,464 A | * | 12/1977 | Grove | 414/462 |
| 4,242,030 A | * | 12/1980 | Clement | 414/462 |
| 5,058,791 A | | 10/1991 | Henriquez et al. | |
| 5,398,778 A | * | 3/1995 | Sexton | 182/127 |
| 5,423,650 A | | 6/1995 | Zerbst et al. | |
| 5,544,796 A | | 8/1996 | Dubach | |
| D385,527 S | | 10/1997 | Kalis | |
| 5,850,891 A | * | 12/1998 | Olms et al. | 182/127 |
| 5,884,824 A | * | 3/1999 | Spring, Jr. | 224/310 |
| 5,904,463 A | | 5/1999 | Christensen | |
| 5,951,231 A | | 9/1999 | Allen | |
| 6,315,181 B1 | * | 11/2001 | Bradley et al. | 224/310 |

* cited by examiner

Primary Examiner—Stephen K. Cronin

(57) ABSTRACT

A roof rack for vehicles to facilitate the transport and unloading of cargo from a roof of a vehicle. The roof rack includes a plate for supporting a load that is mountable to a roof of a vehicle and has a plurality of slots. A plurality of mounting brackets releasably attaches the plate to the vehicle. A pair of actuator assemblies is rotatably couplable to each of the mounting brackets. Each of the actuator assemblies comprises an elongate main member, a plurality of elongate arm members, and a plurality of elongate support members. A lever member for rotatably biasing the actuator assemblies is releasably attachable to a rear end of each of the main members of the actuator assemblies. A plurality of securing members selectively secures the cargo to the top side of the plate. An elongate storage member for storing articles is mounted on the bottom side of the plate. A plurality of extension members facilitates guiding the cargo to a ground surface.

18 Claims, 8 Drawing Sheets

ROOF RACK

BACKGROUND OF THE INVENTION

1. Field of the Invention

The present invention relates to roof racks and more particularly pertains to a new roof rack for vehicles to facilitate the transport and unloading of loads from a roof of a vehicle.

2. Description of the Prior Art

The use of roof racks is known in the prior art. U.S. Pat. No. 5,423,650 describes a retractable cargo rack assembly that is intended to be supported on a support structure, such as the roof of a vehicle. Another type of roof rack is U.S. Pat. No. 5,544,796 having two parallel tracks with a roof section and a pivotal auxiliary section for loading and unloading articles.

While these devices fulfill their respective, particular objectives and requirements, the need remains for a device that is more specifically designed for the unloading of roll-type loads, such as carpet or linoleum stock, in an efficient and safe manner.

SUMMARY OF THE INVENTION

The present invention meets the needs presented above by the utilization of curved arm members that are rotatable through slots in the main support surface attached to the roof of a vehicle, which function in conjunction with side support members and extension members for unloading to a ground surface.

Still yet another object of the present invention is to provide a new roof rack that reduces the risk of injury or strain when unloading carpet, vinyl flooring, pipe, and other heavy oversized cargo.

Even still another object of the present invention is to provide a new roof rack that permits faster unloading of cargo.

To this end, the present invention generally comprises a plate for supporting a load that is mountable to a roof of a vehicle and has a plurality of slots. A plurality of mounting brackets releasably attaches the plate to the vehicle. A pair of actuator assemblies is rotatably couplable to each of the mounting brackets. Each of the actuator assemblies comprises an elongate main member, a plurality of elongate arm members, and a plurality of elongate support members. A lever member for rotatably biasing the actuator assemblies is releasably attachable to a rear end of each of the main members of the actuator assemblies. A plurality of securing members selectively secures the load to the top side of the plate. An elongate storage member for storing articles is mounted on the bottom side of the plate. A plurality of extension members is releasably attachable to each of the actuator assemblies for the facilitation of guiding the load to a ground surface.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
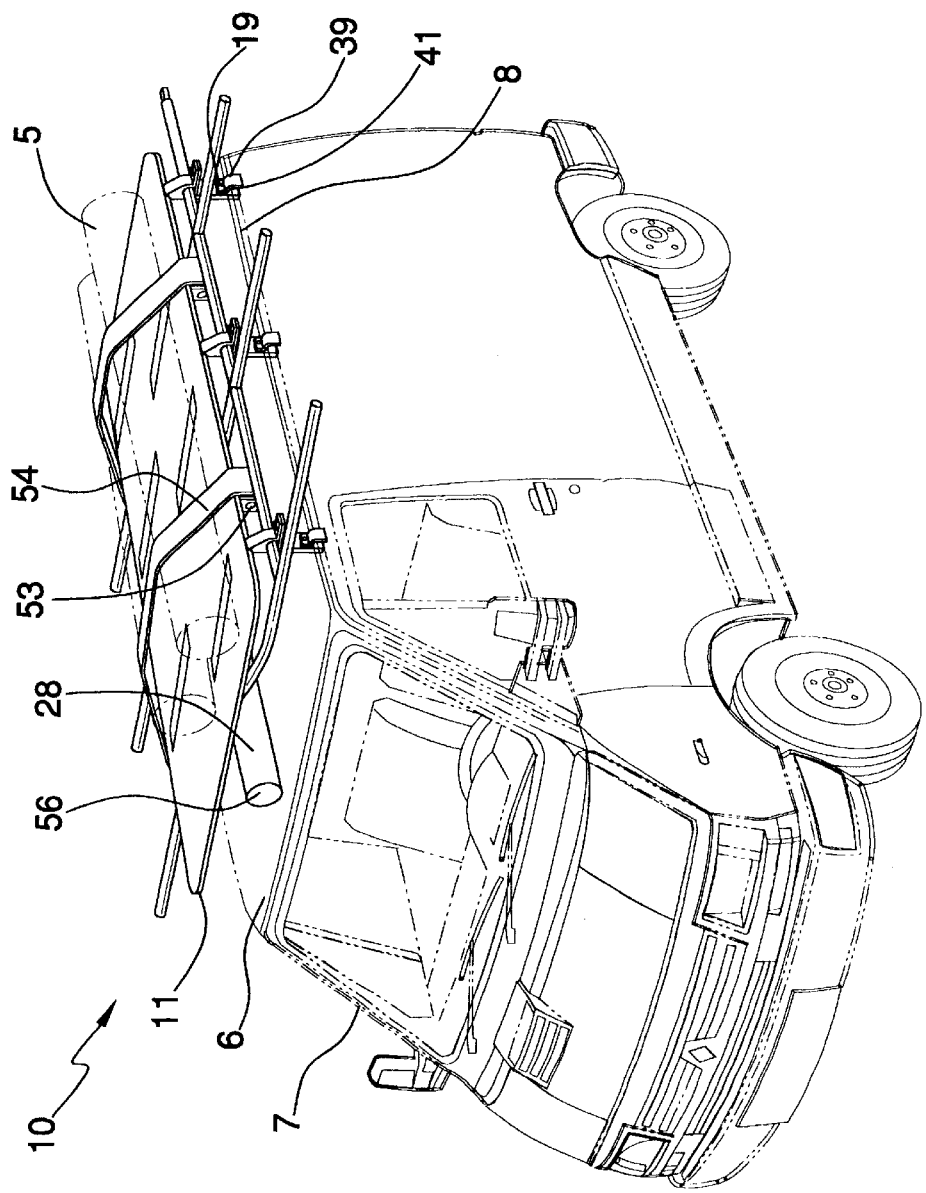
FIG. 1 is a schematic perspective view of a new roof rack with cargo loaded for transport according to the present invention.
Figure 2:
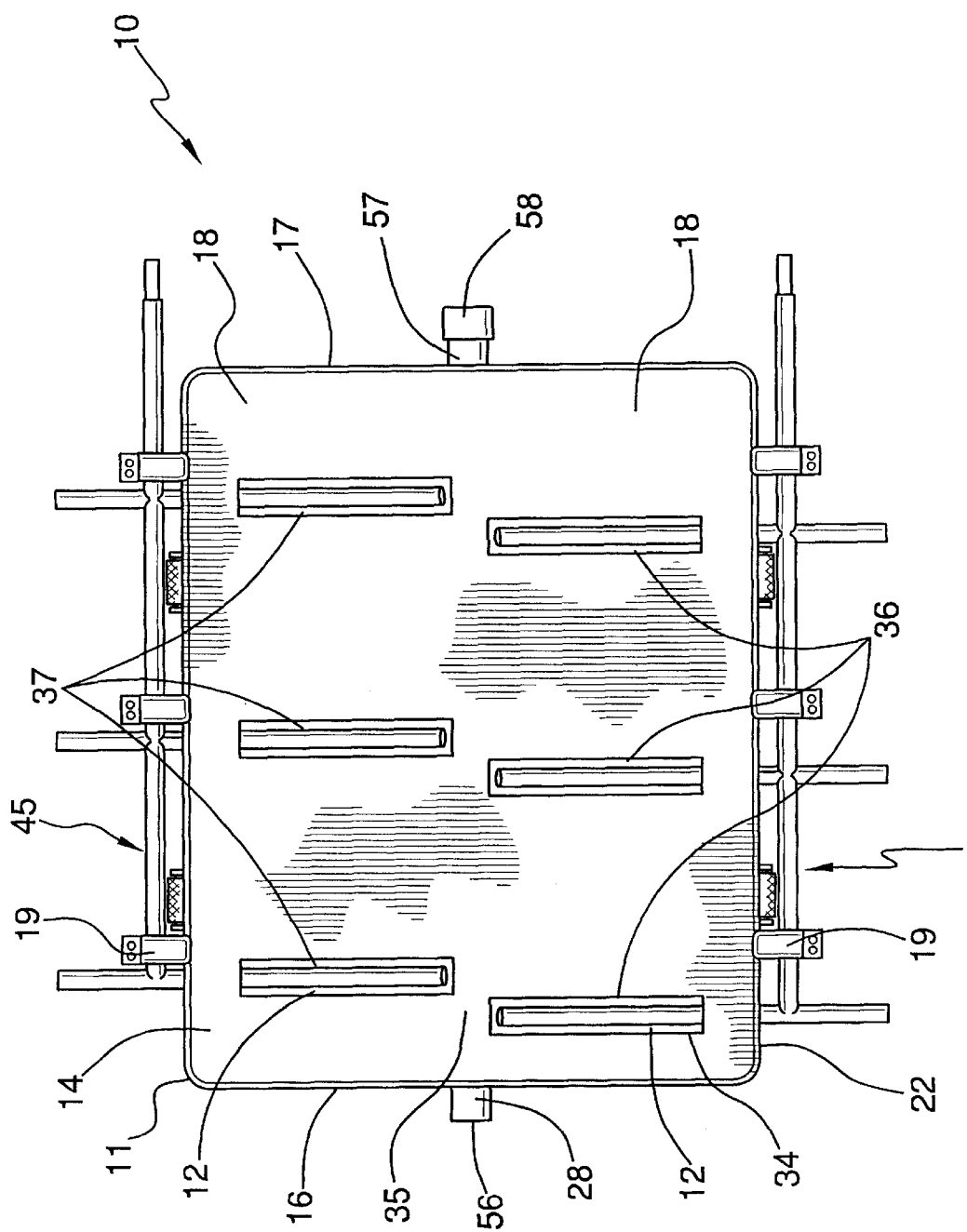
FIG. 2 is a schematic top view of the present invention.
Figure 3:
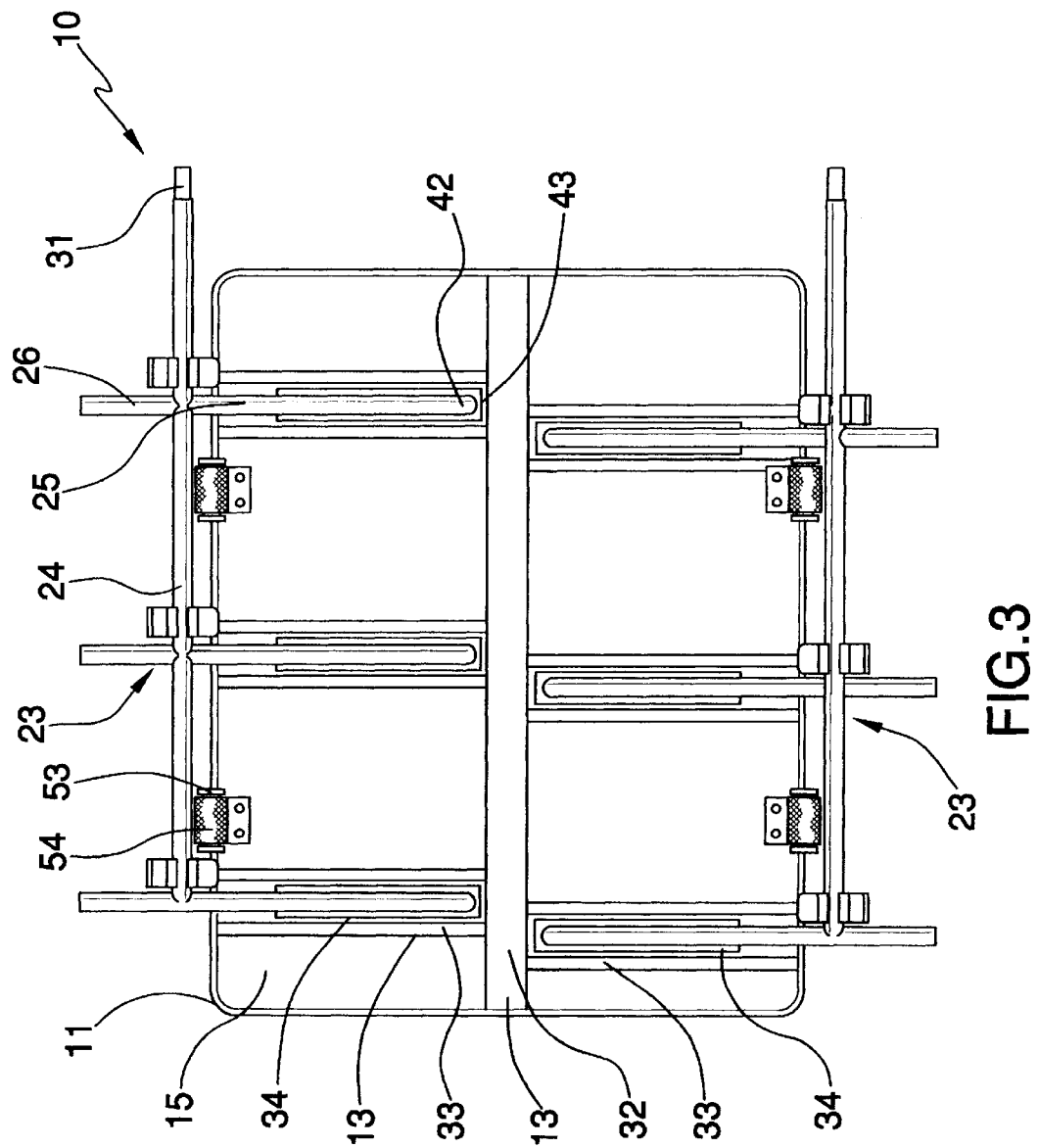
FIG. 3 is a schematic bottom view of the present invention with the storage member removed.
Figure 4:
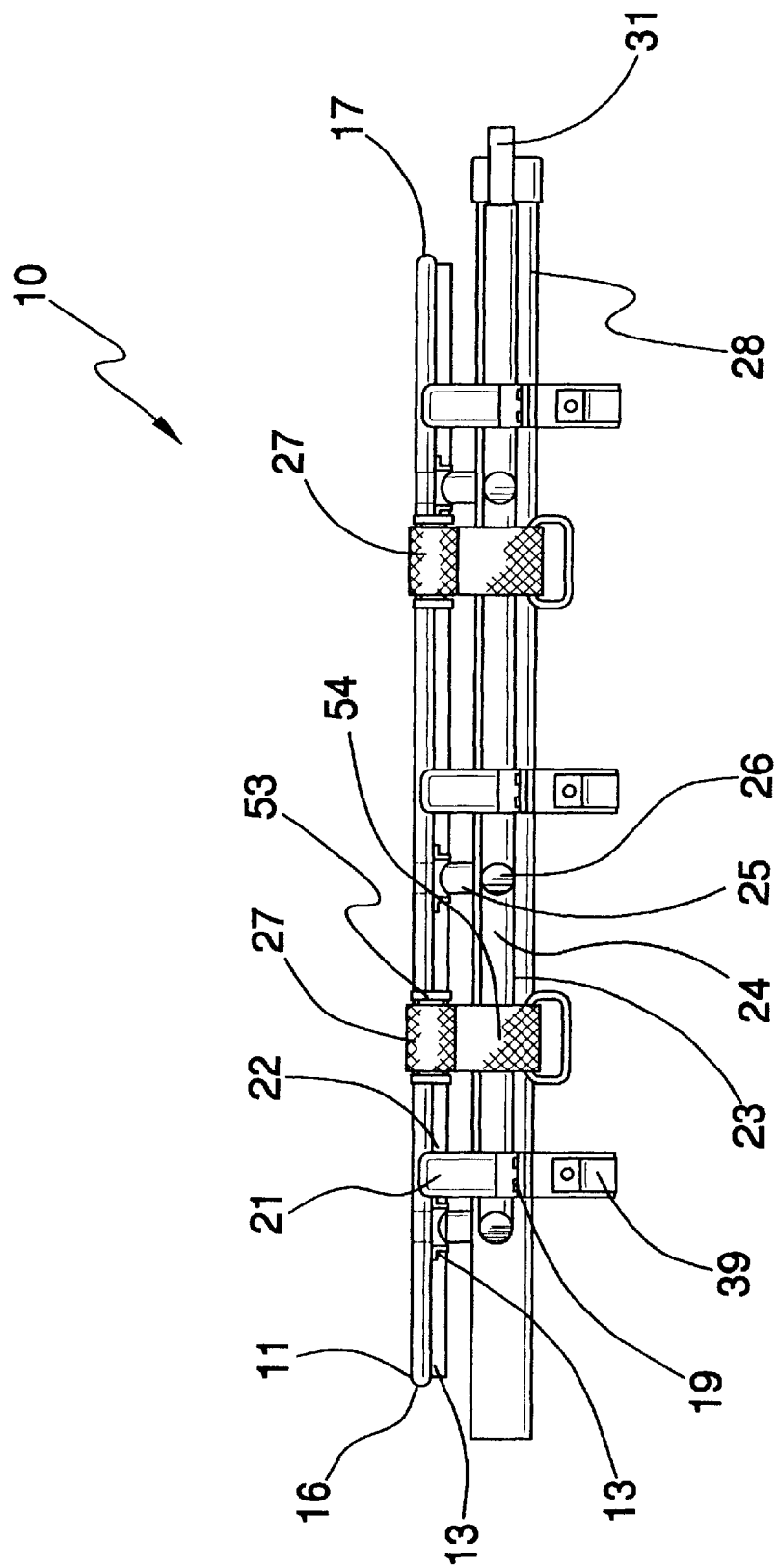
FIG. 4 is a schematic side view of the present invention.
Figure 5:
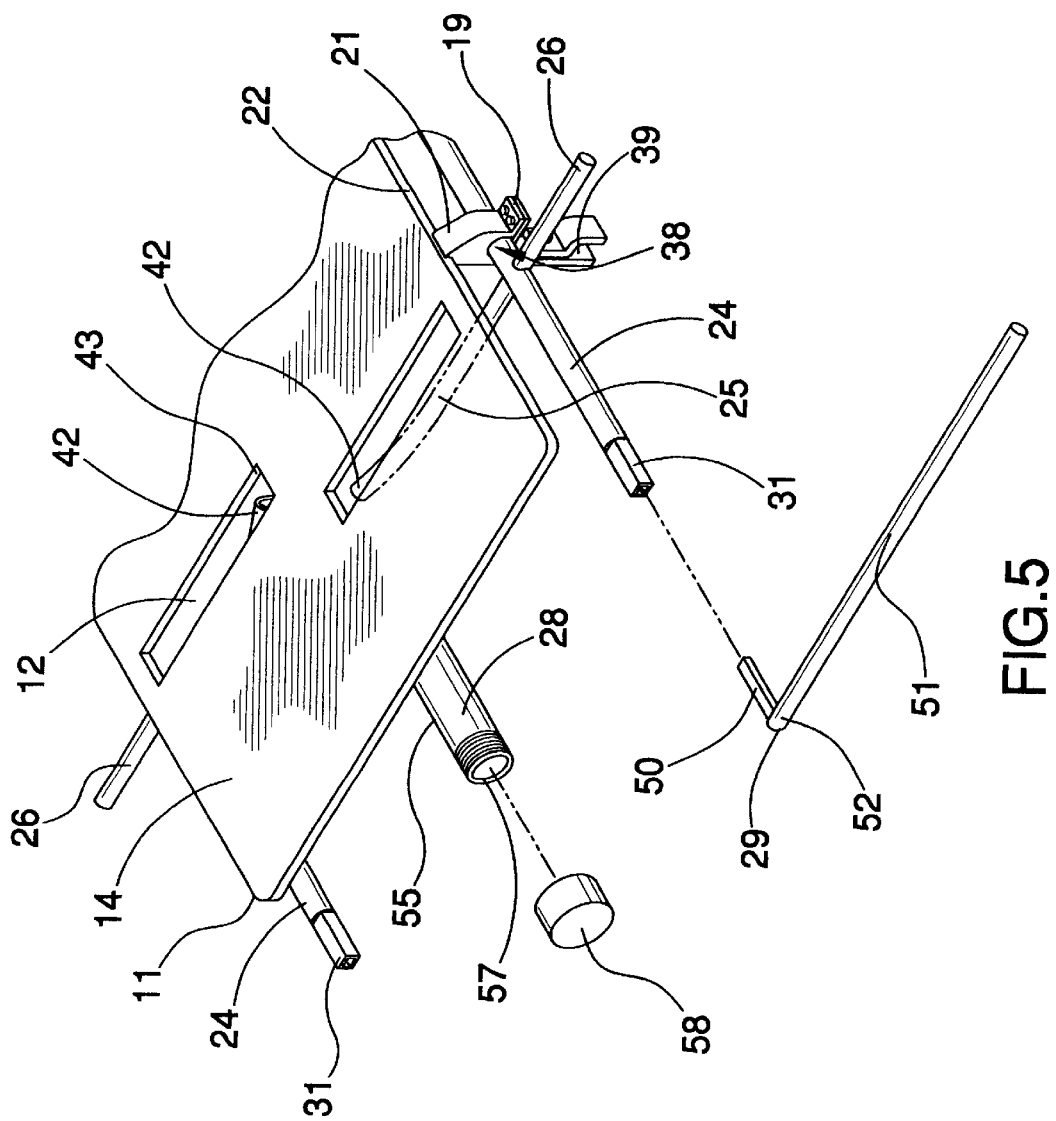
FIG. 5 is a schematic perspective sectional view of the back end of the present invention.
Figure 6:
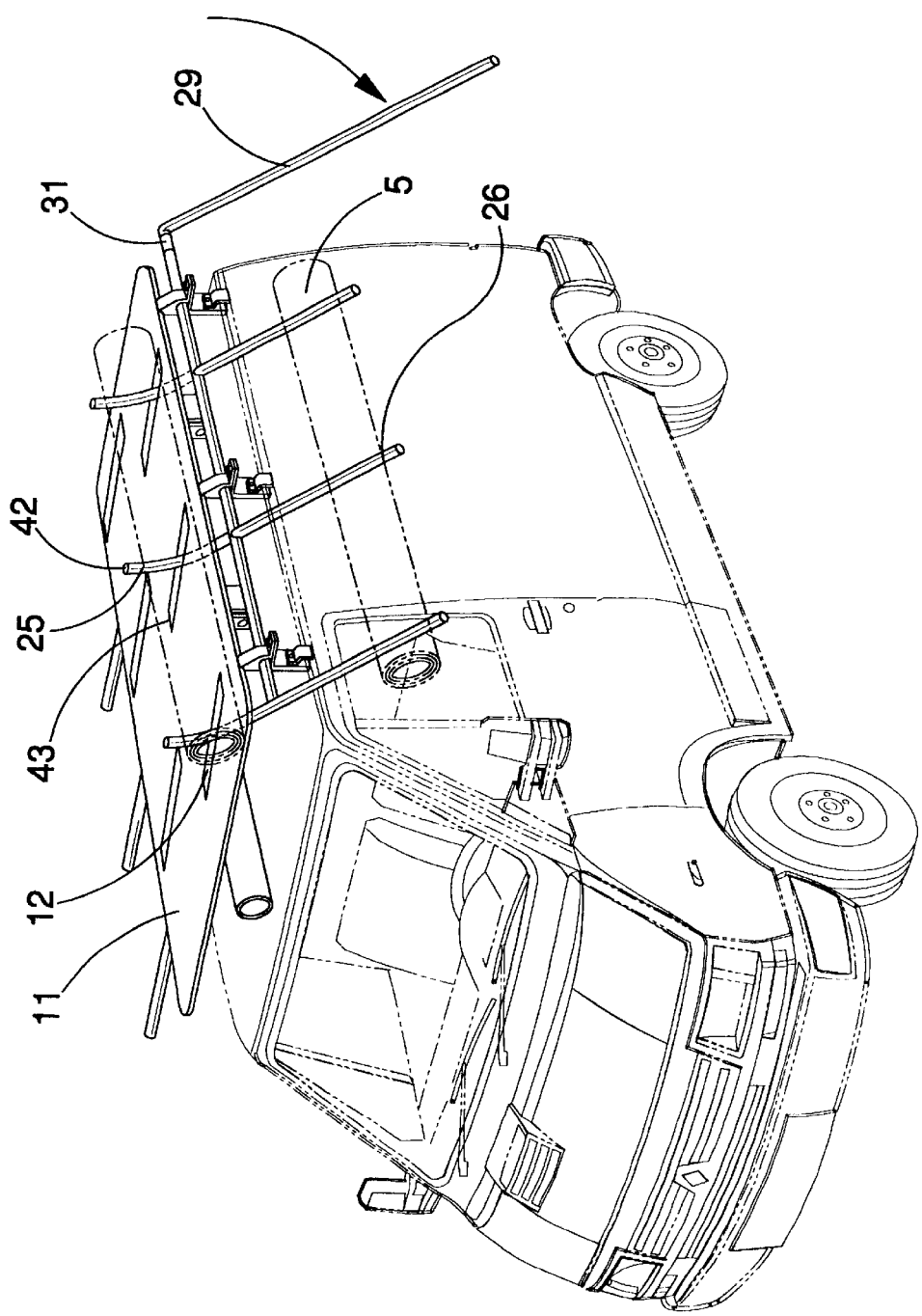
FIG. 6 is a schematic perspective view of the present invention with the cargo being unloaded onto the support members.
Figure 7:
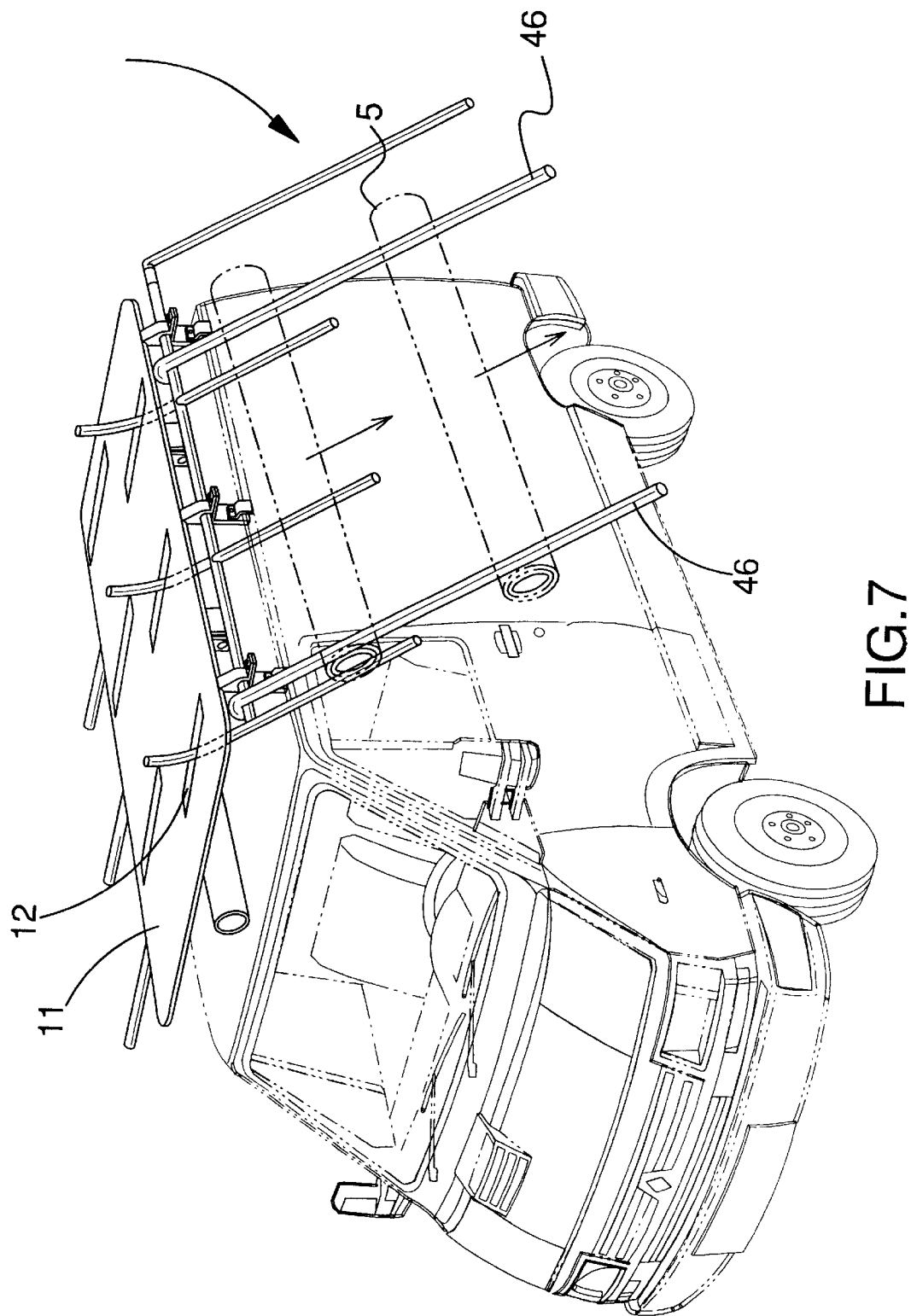
FIG. 7 is a schematic perspective view of the present invention with the cargo being unloaded to the ground by use of the extension members.
Figure 8:
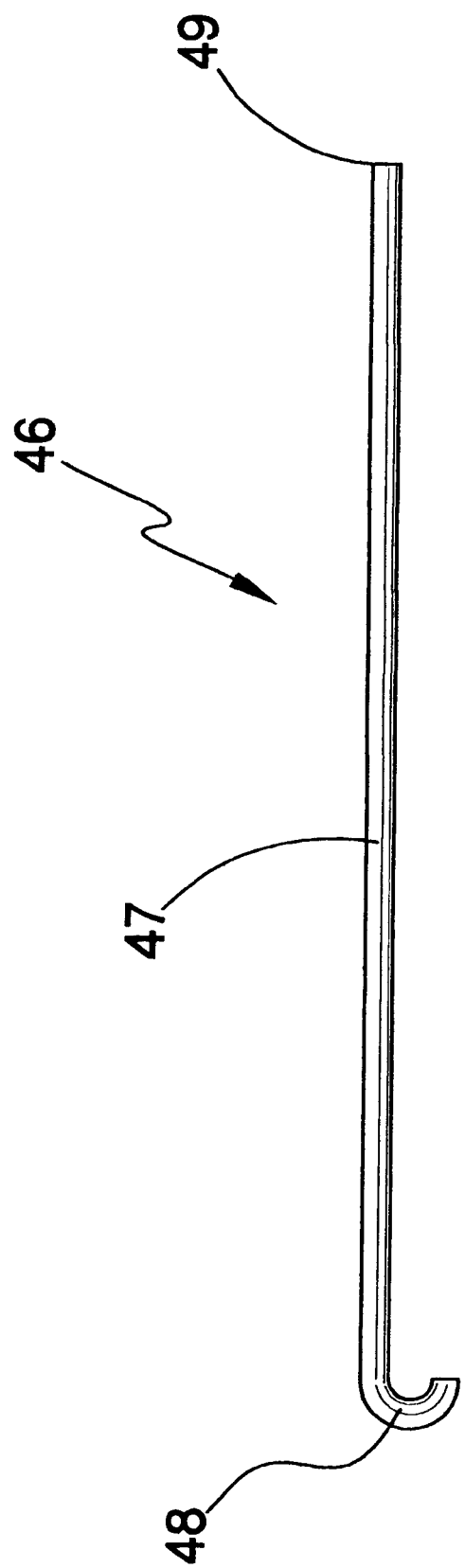
FIG. 8 is a schematic side view of an extension member of the present invention.

With reference now to the drawings, and in particular to FIGS. 1 through 8 thereof, a new roof rack embodying the principles and concepts of the present invention and generally designated by the reference numeral 10 will be described.

As best illustrated in FIGS. 1 through 8, the roof rack 10 generally comprises a plate 11 for supporting a load 5. The plate 11 is mountable to a roof 6 of a vehicle 7 and has a plurality of slots 12. The plate 11 has a plurality of bearing members 13 for added structural support. The plate 11 has a top side 14, a bottom side 15, a front end 16, a back end 17, and a pair of sides 18.

A plurality of mounting brackets 19 releasably attaches the plate 11 to the vehicle 7. A top portion 21 of each of the mounting brackets 19 is mounted on an outer edge 22 of each of the sides 18 of the plate 11 and extends downward in a generally perpendicular manner.

A pair of actuator assemblies 23 is rotatably couplable to each of the mounting brackets 19. Each of the actuator assemblies 23 comprises an elongate main member 24, a plurality of elongate arm members 25, and a plurality of elongate support members 26.

A plurality of securing members 27 selectively secures the load 5 to the top side 14 of the plate 11.

An elongate storage member 28 for storing articles is mounted on the bottom side 15 of the plate 11. The storage member 28 is centrally positioned on the plate 11 and is oriented substantially parallel to a longitudinal axis of the plate 11.

A lever member 29 for rotatably biasing the actuator assemblies 23 is releasably attachable to a rear end 31 of each of the main members 24 of the actuator assemblies 23.

The plurality of bearing members 13 comprises a main bearing member 32 and a plurality of slot bearing members 33 that are fixedly coupled to the bottom side 15 of the plate 11. The main bearing member 32 extends between the front and back ends 16, 17 of the plate 11 and is centrally located between the sides 18 and is oriented substantially parallel to the longitudinal axis of the plate 11. Each of the slot bearing members 33 is attached to the main bearing member 32 and extends outward to the outer edges 22 of the plate 11 in a substantially perpendicular manner. Each of the slot bearing members 33 is positioned adjacent to outside edges 34 of each of the slots 12 of the plate 11.

Each of the slots 12 of the plate 11 is oriented substantially perpendicular to the longitudinal axis of the plate 11 and extends generally from a central portion 35 of the plate 11 outward towards each of the outer edges 22 of the sides 18. Each of the slots 12 of the plate 11 has a width generally greater than a width of each of the arm members 25 of the actuator assemblies 23 such that each of the arm members 25 is permitted to pass through the slots 12.

The plurality of slots 12 of the plate 11 comprises a first slot set 36 and a second slot set 37, each being located on one of the sides 18 of the plate 11. Each of the slot sets 36, 37 is generally offset with respect to each other such that the plurality of slots 12 has a generally staggered configuration.

Each of the mounting brackets 19 has a bore 38 oriented substantially parallel to the longitudinal axis of the plate 11 and is designed for rotatably receiving the main member 24 of the actuator assemblies 23.

A bottom portion 39 of each of the mounting brackets 19 comprises an attachment portion 41 for releasably attaching the mounting brackets 19 to a perimeter edge 8 of the roof 6 of the vehicle 7. Each of the mounting brackets 19 is positionable adjacent to each of the arm members 25 and the support members 26 of the actuator assemblies 23.

Each of the arm members 25 and the support members 26 are attached to and extend away from the main member 24 in opposite directions and is oriented substantially perpendicular to the main member 24.

Each of the arm members 25 of the actuator assemblies 23 extends inwardly towards the plate 11 and is positioned proximate to the bottom side 15 of the plate 11.

Each of the arm members 25 is generally arcuate and curves upward from the main members 24 to a free end 42 of the arm members 25 such that each of the free ends 42 is positioned adjacent to the bottom side 15 of the plate 11.

Each of the arm members 25 has a length generally equal to a distance from the outer edges 22 of the plate 11 to an inner end 43 of each of the slots 12 of the plate 11.

The pair of actuator assemblies 23 comprises a first actuator assembly 44 and a second actuator assembly 45. The arm members 25 of the first and second actuator assemblies 23 are substantially alignable with each of the slots 12 of the first and second slot sets 36, 37 respectively.

Rotation of the main members 24 of the actuator assemblies 23 causes each of the associated arm members 25 to rotate upwardly through a respective slot set, simultaneously biasing a load 5 positioned on a respective side 18 of the plate 11, outward towards a respective outer edge 22 of the plate 11 and off of the plate 11. The load 5 subsequently moves onto the support members 26 to facilitate removing the load 5 when a respective one of the actuator assemblies 23 is rotated.

A plurality of extension members 46 is releasably attachable to each of the actuator assemblies 23 for the facilitation of guiding the load 5 to a ground surface. Each of the extension members 46 comprises an elongate bar 47 that has a J-shaped end portion 48 for selectively coupling to the main members 24 of the actuator assemblies 23 and a distal end 49 for abutting the ground surface.

The lever member 29 comprises a coupling portion 50 and a lever portion 51. The coupling portion 50 is located adjacent to a coupling end 52 of the lever portion 51 and is oriented substantially perpendicular to the lever portion 51 such that the lever member 29 is L-shaped.

The coupling portion 50 of the lever member 29 has a shape conforming to the rear end 31 of each of the main members 24 of the actuator assemblies 23 such that the lever member 29 is positively engagable with the main members 24 to facilitate rotation of the actuator assemblies 23 for biasing the load 5 off of the plate 11 and down onto each of the support members 26 and each of the extension members 46 when the extension members 46 are coupled to the actuator assemblies 23.

Each of the securing members 27 is mounted to the bottom side 15 of the plate 11 and is positioned adjacent to the outer edge 22 of each of the sides 18. The plurality of securing members 27 comprises two sets of strap winding mechanisms 53 for selectively securing a strap 54 over the load 5 for the purpose of restricting movement of the load 5 during transit.

The storage member 28 comprises a tubular member 55 that has a closed forward end 56 and an open rearward end 57. The storage member 28 includes an end cap 58 for selectively closing the rearward end 57.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A roof rack for a vehicle, said roof rack comprising:
    a plate for supporting a load, said plate being mountable to a vehicle and being positionable generally above a roof of the vehicle, said plate having a plurality of slots extending therethrough, said plate having a plurality of bearing members for adding structural support to said plate, said plate having a top side, a bottom side, a front end, a back end, and a pair of sides;
    a plurality of mounting brackets for releasably attaching said plate to the vehicle, a top portion of each of said mounting brackets being mounted on an outer edge of each of said sides of said plate and extending downwardly in a generally perpendicular manner;
    a pair of actuator assemblies being rotatably couplable to each of said mounting brackets, each of said actuator assemblies comprising an elongate main member, a plurality of elongate arm members, and a plurality of elongate support members;
    a plurality of securing members for selectively securing the load to said top side of said plate;
    an elongate storage member for storing articles being mounted on said bottom side of said plate, said storage member being centrally positioned on said plate and being oriented substantially parallel to a longitudinal axis of said plate; and a lever member for rotatably biasing said actuator assemblies, said lever member being releasably attachable to a rear end of each of said main members of said actuator assemblies.

2. The roof rack as set forth in claim 1, further comprising said plurality of bearing members comprising a main bearing member and a plurality of slot bearing members being fixedly coupled to said bottom side of said plate, said main bearing member extending between said front and back ends of said plate and being centrally located between said sides and being oriented substantially parallel to the longitudinal axis of said plate; and each of said slot bearing members being attached to said main bearing member and extending outwardly to said outer edges of said plate in a substantially perpendicular manner, each of said slot bearing members being positioned adjacent to outside edges of each of said slots of said plate.

3. The roof rack as set forth in claim 1, further comprising each of said slots of said plate being oriented substantially perpendicular to the longitudinal axis of said plate and extending generally from a central portion of said plate outwardly towards each of said outer edges of said sides; and each of said slots of said plate having a width being generally greater than a width of each of said arm members of said actuator assemblies such that each of said arm members is permitted to pass through said slots.

4. The roof rack as set forth in claim 1, further comprising each of said mounting brackets having a bore extending therethrough, each of said bores being oriented substantially parallel to the longitudinal axis of said plate and being adapted for rotatably receiving said main member of said actuator assemblies.

5. The roof rack as set forth in claim 1, further comprising a bottom portion of each of said mounting brackets comprising an attachment portion for releasably attaching said mounting brackets to a perimeter edge of the roof of the vehicle, each of said mounting brackets being positionable adjacent to each of said arm members and said support members of said actuator assemblies.

6. The roof rack as set forth in claim 1, further comprising each of said arm members and said support members being attached to and extending away from said main member in opposite directions and being oriented substantially perpendicular to said main member.

7. The roof rack as set forth in claim 1, further comprising each of said arm members of said actuator assemblies extending inwardly towards said plate and being positioned proximate to said bottom side of said plate.

8. The roof rack as set forth in claim 1, further comprising each of said arm members being generally arcuate and curving upwardly from said main members to a free end of said arm members such that each of said free ends is positioned adjacent to said bottom side of said plate.

9. The roof rack as set forth in claim 1, further comprising each of said arm members having a length generally equal to a distance from said outer edges of said plate to an inner end of each of said slots of said plate.

10. The roof rack as set forth in claim 1, further comprising said lever member comprising a coupling portion and a lever portion, said coupling portion being located adjacent to a coupling end of said lever portion and being oriented substantially perpendicular to said lever portion such that said lever member is L-shaped.

11. The roof rack as set forth in claim 1, further comprising each of said securing members being mounted to said bottom side of said plate and being positioned adjacent to said outer edge of each of said sides; and said plurality of securing members comprising two sets of strap winding mechanisms for selectively securing a strap over the load for the purpose of restricting movement of the load during transit.

12. The roof rack as set forth in claim 1, further comprising said storage member comprising a tubular member having a closed forward end and an open rearward end, said storage member including an end cap for selectively closing said rearward end.

13. The roof rack as set forth in claim 1, further comprising a plurality of extension members being releasably attachable to each of said actuator assemblies for the facilitation of guiding the load to a ground surface, each of said extension members comprising an elongate bar having a J-shaped end portion for selectively coupling to said main members of said actuator assemblies and a distal end for abutting the ground surface.

14. The roof rack as set forth in claim 13, further comprising said coupling portion of said lever member having a shape conforming to said rear end of each of said main members of said actuator assemblies such that said lever member is positively engagable with said rear end of said main members to facilitate rotation of said actuator assemblies for the purpose of biasing the load off of said plate and down onto each of said support members and each of said extension members when said extension members are coupled to said actuator assemblies.

15. The roof rack as set forth in claim 1, further comprising said plurality of slots of said plate comprising a first slot set and a second slot set each being located on one of said sides of said plate, each of said slot sets being generally offset with respect to each other such that said plurality of slots has a generally staggered configuration.

16. The roof rack as set forth in claim 15, further comprising said pair of actuator assemblies comprising a first actuator assembly and a second actuator assembly, said arm members of said first and second actuator assemblies being substantially alignable with each of said slots of said first and second slot sets respectively.

17. The roof rack as set forth in claim 15, wherein rotation of said main members of said actuator assemblies causes each of said associated arm members to rotate upwardly through a respective slot set and simultaneously biasing a load positioned on a respective side of said plate outwardly towards a respective outer edge of said plate and off of said plate; and wherein the load subsequently moves onto said support members to facilitate removing the load when a respective one of said actuator assemblies is rotated.

18. A roof rack for a vehicle, said roof rack comprising:

a plate for supporting a load, said plate being mountable to a vehicle and being positionable generally above a roof of the vehicle, said plate having a plurality of slots extending therethrough, said plate having a plurality of bearing members for adding structural support to said plate, said plate having a top side, a bottom side, a front end, a back end, and a pair of sides;

a plurality of mounting brackets for releasably attaching said plate to the vehicle, a top portion of each of said mounting brackets being mounted on an outer edge of each of said sides of said plate and extending downwardly in a generally perpendicular manner;

a pair of actuator assemblies being rotatably couplable to each of said mounting brackets, each of said actuator assemblies comprising an elongate main member, a plurality of elongate arm members, and a plurality of elongate support members;

a plurality of securing members for selectively securing the load to said top side of said plate;

an elongate storage member for storing articles being mounted on said bottom side of said plate, said storage member being centrally positioned on said plate and being oriented substantially parallel to a longitudinal axis of said plate;

a lever member for rotatably biasing said actuator assemblies, said lever member being releasably attachable to a rear end of each of said main members of said actuator assemblies;

said plurality of bearing members comprising a main bearing member and a plurality of slot bearing members being fixedly coupled to said bottom side of said plate, said main bearing member extending between said front and back ends of said plate and being centrally located between said sides and being oriented substantially parallel to the longitudinal axis of said plate, each of said slot bearing members being attached to said main bearing member and extending outwardly to said outer edges of said plate in a substantially perpendicular manner, each of said slot bearing members being positioned adjacent to outside edges of each of said slots of said plate;

each of said slots of said plate being oriented substantially perpendicular to the longitudinal axis of said plate and extending generally from a central portion of said plate outwardly towards each of said outer edges of said sides, each of said slots of said plate having a width being generally greater than a width of each of said arm members of said actuator assemblies such that each of said arm members is permitted to pass through said slots, said plurality of slots of said plate comprising a first slot set and a second slot set each being located on one of said sides of said plate, each of said slot sets being generally offset with respect to each other such that said plurality of slots has a generally staggered configuration;

each of said mounting brackets having a bore extending therethrough, each of said bores being oriented substantially parallel to the longitudinal axis of said plate and being adapted for rotatably receiving said main member of said actuator assemblies, a bottom portion of each of said mounting brackets comprising an attachment portion for releasably attaching said mounting brackets to a perimeter edge of the roof of the vehicle, each of said mounting brackets being positionable adjacent to each of said arm members and said support members of said actuator assemblies;

each of said arm members and said support members being attached to and extending away from said main member in opposite directions and being oriented substantially perpendicular to said main member, each of said arm members of said actuator assemblies extending inwardly towards said plate and being positioned proximate to said bottom side of said plate, each of said arm members being generally arcuate and curving upwardly from said main members to a free end of said arm members such that each of said free ends is positioned adjacent to said bottom side of said plate, each of said arm members having a length generally equal to a distance from said outer edges of said plate to an inner end of each of said slots of said plate, said pair of actuator assemblies comprising a first actuator assembly and a second actuator assembly, said arm members of said first and second actuator assemblies being substantially alignable with each of said slots of said first and second slot sets respectively, wherein rotation of said main members of said actuator assemblies causes each of said associated arm members to rotate upwardly through a respective slot set and simultaneously biasing a load positioned on a respective side of said plate outwardly towards a respective outer edge of said plate and off of said plate, wherein the load subsequently moves onto said support members to facilitate removing the load when a respective one of said actuator assemblies is rotated;

a plurality of extension members being releasably attachable to each of said actuator assemblies for the facilitation of guiding the load to a ground surface, each of said extension members comprising an elongate bar having a J-shaped end portion for selectively coupling to said main members of said actuator assemblies and a distal end for abutting the ground surface;

said lever member comprising a coupling portion and a lever portion, said coupling portion being located adjacent to a coupling end of said lever portion and being oriented substantially perpendicular to said lever portion such that said lever member is L-shaped, said coupling portion of said lever member having a shape conforming to said rear end of each of said main members of said actuator assemblies such that said lever member is positively engagable with said rear end of said main members to facilitate rotation of said actuator assemblies for the purpose of biasing the load off of said plate and down onto each of said support members and each of said extension members when said extension members are coupled to said actuator assemblies;

each of said securing members being mounted to said bottom side of said plate and being positioned adjacent to said outer edge of each of said sides, said plurality of securing members comprising two sets of strap winding mechanisms for selectively securing a strap over the load for the purpose of restricting movement of the load during transit; and said storage member comprising a tubular member having a closed forward end and an open rearward end, said storage member including an end cap for selectively closing said rearward end.

\* \* \* \* \*